No. 645,134. Patented Mar. 13, 1900.
A. G. SABERG, A. H. BENSON & E. G. SABERG.
CLOTH CUTTER.
(Application filed Jan. 3, 1899.)
(No Model.) 4 Sheets—Sheet 1.
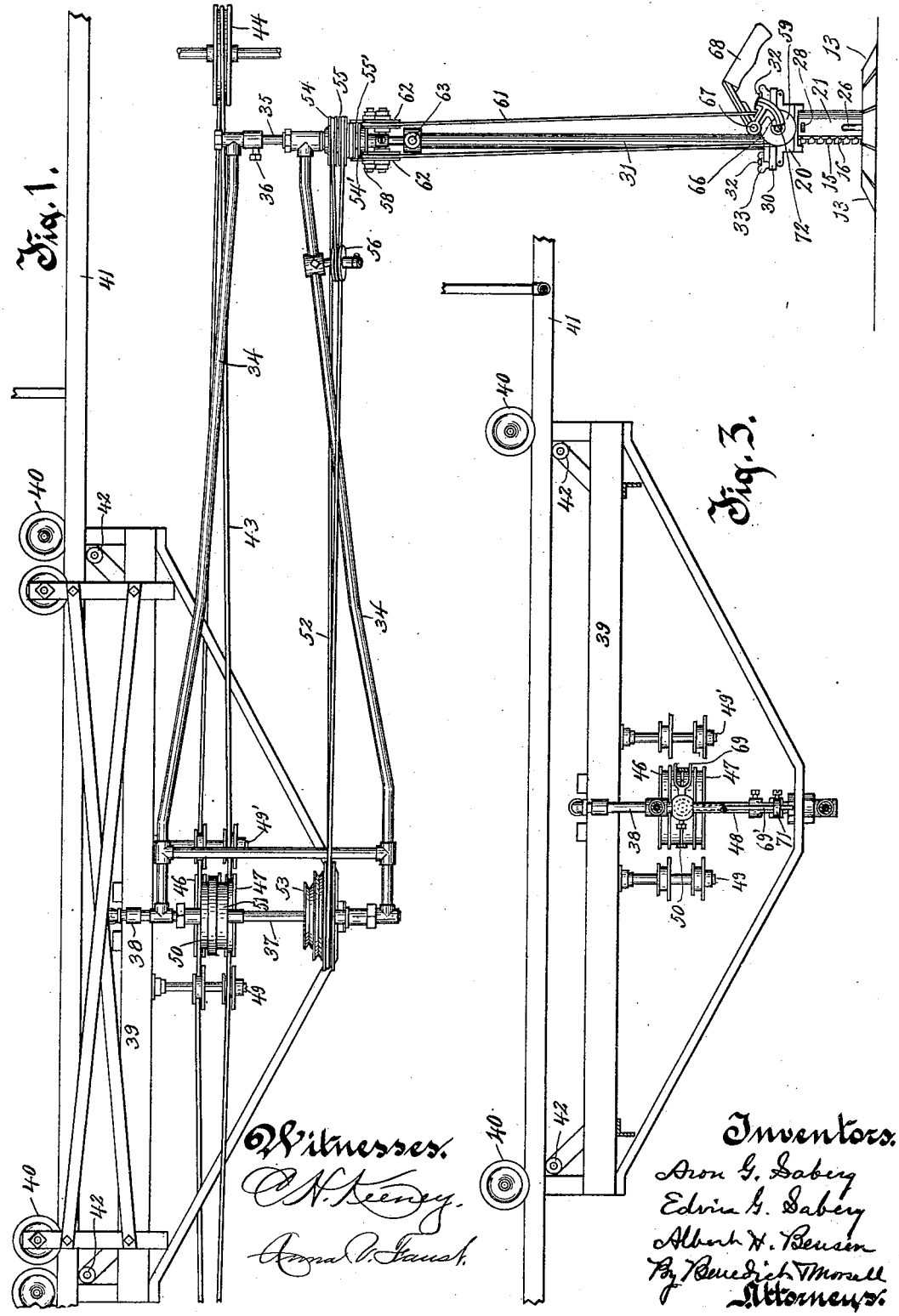

No. 645,134. Patented Mar. 13, 1900.
A. G. SABERG, A. H. BENSON & E. G. SABERG.
CLOTH CUTTER.
(Application filed Jan. 3, 1899.)
(No Model.) 4 Sheets—Sheet 2.
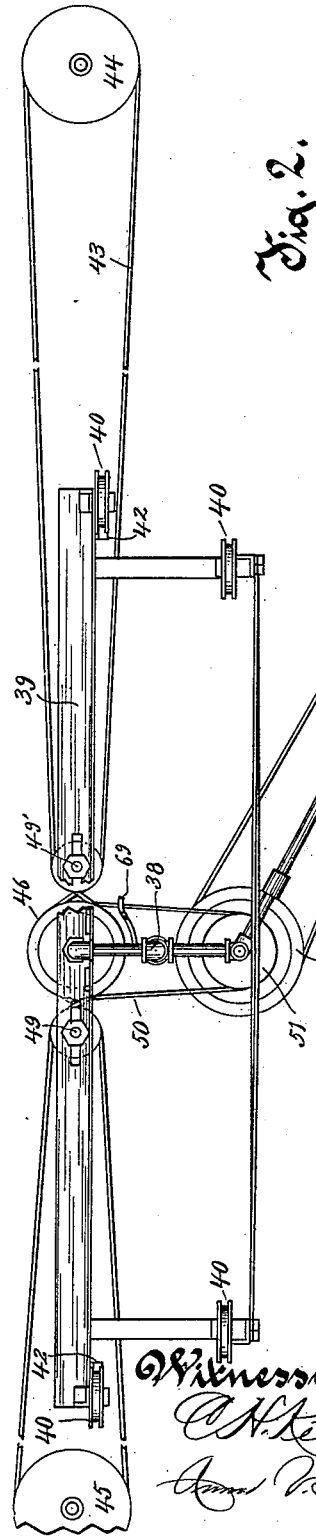
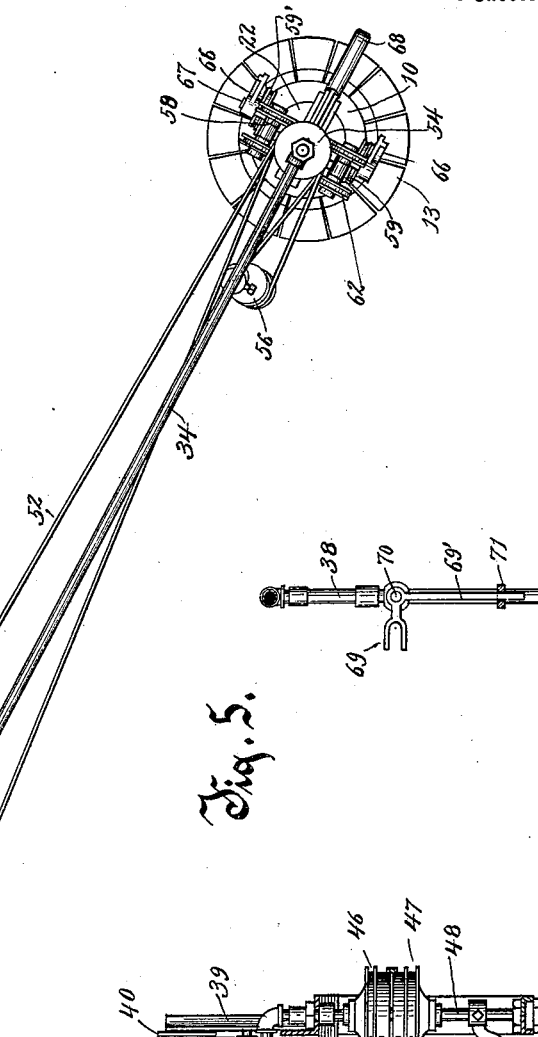
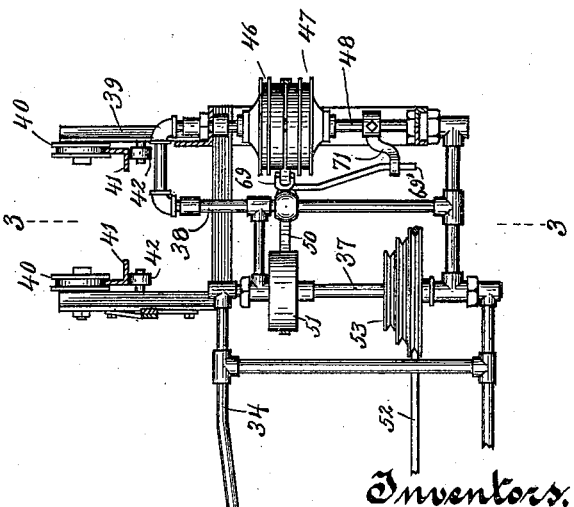
Witnesses.
Inventors.

No. 645,134. Patented Mar. 13, 1900.
A. G. SABERG, A. H. BENSON & E. G. SABERG.
CLOTH CUTTER.
(Application filed Jan. 3, 1899.)
(No Model.) 4 Sheets—Sheet 3.
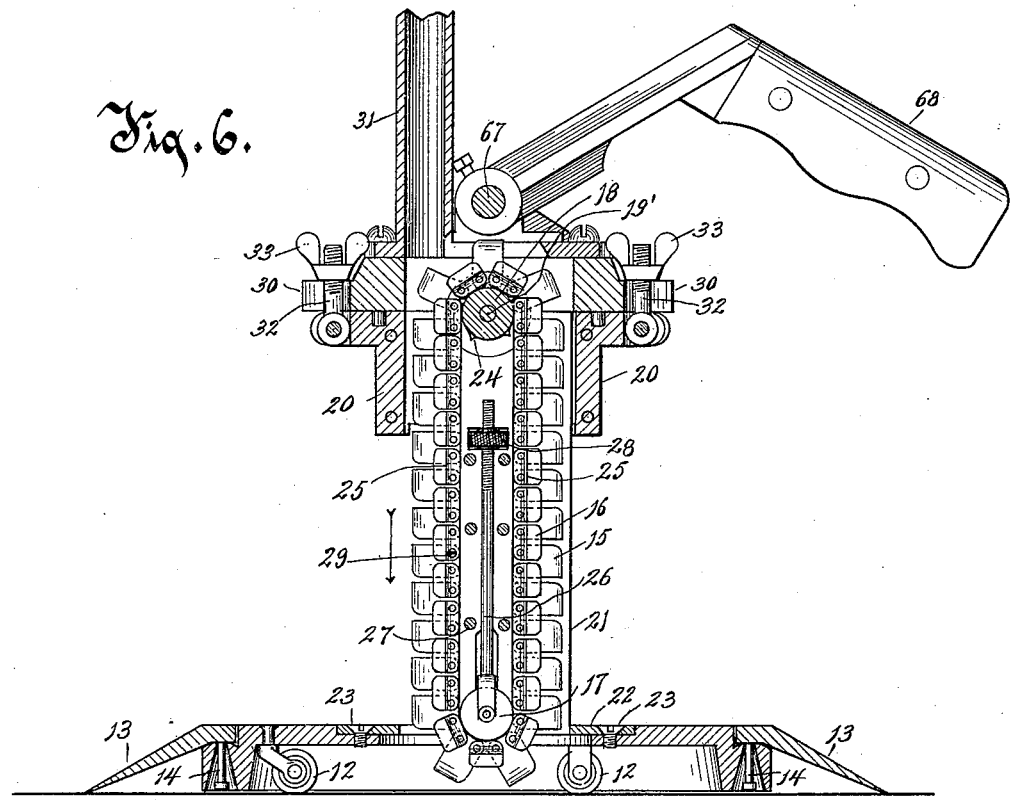
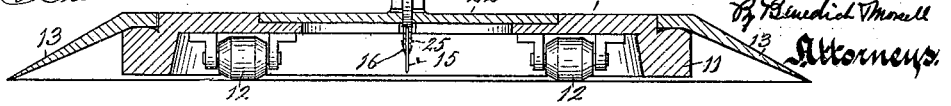

No. 645,134. Patented Mar. 13, 1900.
A. G. SABERG, A. H. BENSON & E. G. SABERG.
CLOTH CUTTER.
(Application filed Jan. 3, 1899.)
(No Model.) 4 Sheets—Sheet 4.
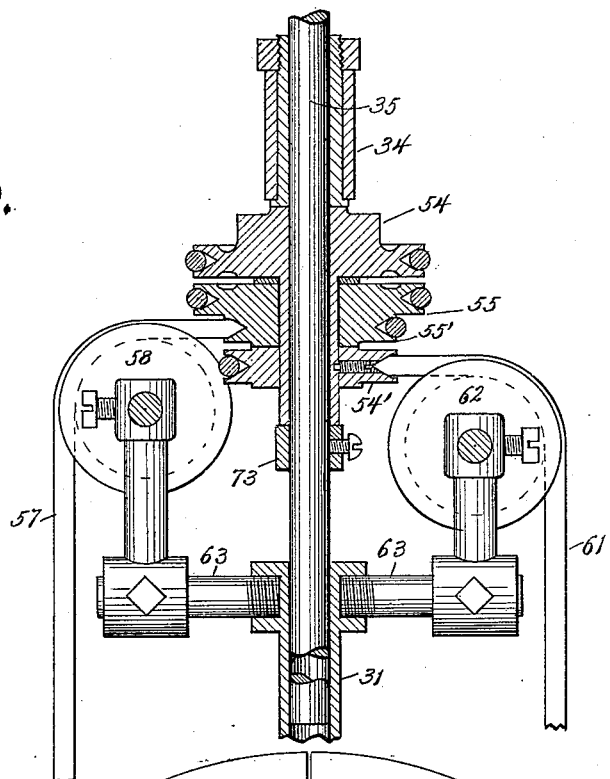
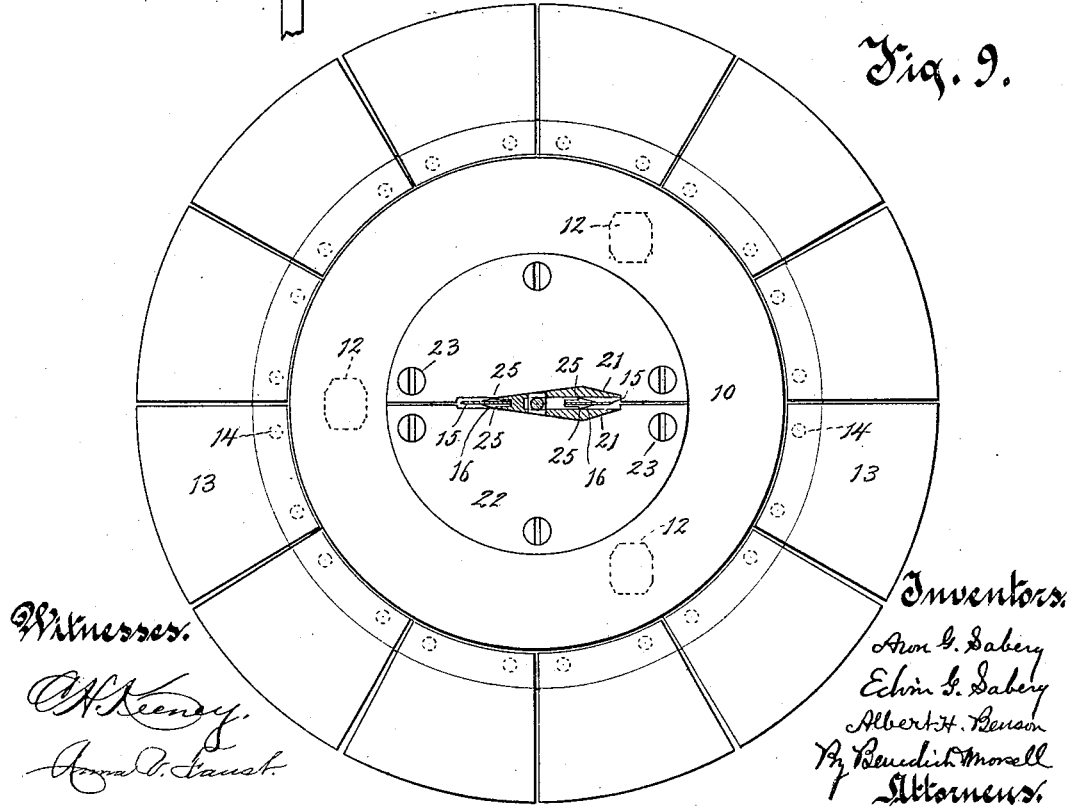

UNITED STATES PATENT OFFICE.

ARON G. SABERG, ALBERT H. BENSON, AND EDVIN G. SABERG, OF RACINE, WISCONSIN.

CLOTH-CUTTER.

SPECIFICATION forming part of Letters Patent No. 645,134, dated March 13, 1900.

Application filed January 3, 1899. Serial No. 701,060. (No model.)

*To all whom it may concern:*

Be it known that we, ARON G. SABERG, ALBERT H. BENSON, and EDVIN G. SABERG, of Racine, in the county of Racine and State of Wisconsin, have invented a new and useful Improvement in Cloth-Cutters, of which the following is a description, reference being had to the accompanying drawings, which are a part of this specification.

Our invention relates to a machine adapted to cut a large number of layers of cloth at the same time, the cutting devices being driven by a power-supply, while the knife or knives are guided by the operator.

The object of the invention is to provide devices and mechanism having adequate strength, combined with capability of freedom of motion and adaptability to cleanly and properly cut through many thicknesses of cloth, whereby a maximum of cloth-cutting can be accomplished easily and quickly.

The invention consists of the mechanism, its parts and combination of parts, as hereinafter described and claimed, or their equivalents.

In the drawings, Figure 1 is an elevation of the complete machine embodying our invention. Fig. 2 is a top plan view of the same machine, parts being broken away for convenience of illustration. Fig. 3 is an elevation of parts of the same mechanism shown in Fig. 1, the parts shown in this figure being chiefly those that are behind the parts seen in Fig. 1. Fig. 4 is an elevation of parts of the mechanism shown at the left in Fig. 1 at a right angle thereto. Fig. 5 is a detail illustrating especially a belt-shifter shown in connection with other parts in Fig. 3. Fig. 6 is an elevation of the cutter and adjacent and related parts. Fig. 7 is a section of the mechanism shown in Fig. 6 at a right angle thereto. Fig. 8 is a detail of belt-carrying mechanism. Fig. 9 is a plan of the foot-plate shown in Figs. 6 and 7, with a cross-section of the cutter and its guide and support.

In our improved cloth-cutter the cutter itself is closely related to a foot-plate that is adapted to rest and travel on a table or suitable supporting-platform, while the driving mechanism connected therewith, including a supporting-carriage, is mounted and travels on rails located at a distance above the plane of the foot-plate and its supporting table or platform, as will be best understood by a reference to Fig. 1.

A foot-plate of circular or other desired form, constructed, preferably, of an annular plate 10, having a downwardly-projecting annular strengthening rib or flange 11, is provided with a plurality of supporting-rollers or casters 12, adapted to rest and travel on a table or platform. This foot-plate is to be so constructed that its peripheral edge shall come closely to the table or platform, so as to be adapted to slide under the cloth or numerous layers of cloth that are to be cut by the machine. To provide this peripheral sharp edge that shall adapt itself to and closely follow the surface of the table or platform, we preferably employ a series of segmental peripherally-marginal segments 13, the outer curved edges of which are thin and comparatively sharp, adapted to rest on the table or platform, and their inner concave edges rest on the annular plate 10 in an annular recess therefor, the surfaces of the segments being made flush with the top surface of the plate 10. These segments 13 are secured to the annular plate 10 by means of bolts or pins 14, Fig. 6, fixed in the under surface of the segments 13 and that extend downwardly through apertures therefor in the plate 10, the apertures being somewhat enlarged diametrically downwardly to provide for a limited amount of flexibility of the segments 13, permitting a slight raising and lowering of the edges of the segments, whereby they are adapted to follow the surface of the table or platform as the foot-plate moves about on it even though that surface of the table or platform is somewhat uneven. This flexible construction of the margin of the foot-plate also provides for the resting of this margin directly on the table even when it is flat, the foot-plate being principally supported by the casters 12. It will be understood that in operation this foot-plate moves about on the table or platform as guided by the operator, passing underneath the supply of material, consisting of many layers of cloth, raising it slightly from the table or platform and in such manner as to bring it to and be cut by the knives of the cutter, as hereinafter described.

For severing or cutting the cloth we employ a cutter comprising a series of knives 15, which in form are thin steel blades having a sharp cutting edge. These knives are connected together by thereto-pivoted links 16, forming an endless flexible chain running on an idle wheel 17 at its lower end and on a driving-wheel 18 at its upper extremity. The wheel 18 is located between two disk 19 19 and is secured thereto by being interposed between the stud-axles of said disks 19, one of the stud-axles being provided with a screw 19', that turns into the stud-axle of the other disk, clamping the two disks together against the interposed wheel 18, encircling the shank of the screw 19'. This construction forms a rigid union of the disks 19 to each other and with the wheel 18. The axle of the disks 19 is journaled in the head-block 20, that is secured permanently to and forms a part of the standard. This standard consists of two plates opposite each other at a little distance apart and are rigid to and may conveniently be made integral with the base-plate 22, that is let into the plate 10 centrally thereof and flush with the surface of that plate. The plate 22 covers a central aperture through the plate 10 and is secured thereto by screws 23. The standard guard-plates 21 are located at a little distance apart, and the endless cutter is located in the space between these plates from the wheel 17 to the wheel 18, but in such manner that the front edges of the knives 15 project beyond the edges of the plates 21, so that the knives are adapted to cut cloth as they go down. The wheel 18 is grooved peripherally and is provided with teeth 24, that take into the spaces between the links 16 and at both sides of the knives 15, thus engaging the endless cutter and compelling its travel synchronously with the rotation of the wheel. It will also be noted that the links 16 are constructed with longitudinally-disposed shoulders 25 25, that in the endless cutter form continuous bearing-surfaces that bear against the front edges of the standard 21 and prevent the knives as they come down and are forced against the cloth from deflecting rearwardly and thus escaping from their work, the shoulders on their side surfaces being substantially flush with the sides of the standard.

The wheel 17 is mounted in the furcate extremity of an adjusting-rod 26, which is located between the plates of the standard 21 and is prevented from escaping toward the front or the rear by a series of pins 27, fixed in the plates transversely of the standard 21. A nut 28, located in slots therefor in the plates of the standard, turns by its screw-thread on the rod 26 and is adapted to move the wheel 17 farther from or nearer to the driving-wheel 18, thereby regulating the tension of the endless cutter, the wheel 17 being, in fact, capable of such withdrawal upwardly from its normal position as to permit of the removal of the endless cutter from the machine for the purpose of sharpening the knives. One of the links is secured to one of the knives by a screw 29 for this purpose. The head-block 20 is located opposite and is complementary to a head-block 30, fixed on the lower extremity of a hollow upwardly-projecting post 31. The head-block 20 is provided with thereto-pivoted bolts 32, which are arranged to swing into recesses therefor in the lateral extremities of the head-block 30, and the nuts 33 thereon turning against the head-block 30 clamps the head-block 20 and the mechanism supported thereon detachably to the head-block 30.

A horizontally-disposed swinging arm 34, conveniently constructed of two tubular members, is provided at its free extremity with a rod or pintle 35, that is secured rigidly but detachably in heads therefor on the arm 34 by the set-screw 36, and this rod or pintle extends downwardly loosely into the hollow post 31, whereby the post is connected to the free extremity of the arm 34, but so as to be revoluble about its own axis around the pintle 35. The arm 34 at its inner extremity is provided with a shaft 37, by which it is pivoted in a horizontally-disposed swinging frame 38, conveniently made of hollow tubing or gas-pipe, which frame 38 at its inner end is pivoted on a carriage-frame 39. The carriage 39 is provided with flanged wheels 40, by which it is made capable of traveling reciprocally on the rails 41, preferably made of angle-iron and suspended from some suitable support. Idle wheels 42 on the carriage bear against the under sides of the rails 41 and prevent the carriage from accidentally jumping off its track.

An endless belt 43 runs on a driven pulley 44 and at the other end of its line of travel on an idle-pulley 45. These pulleys 44 and 45 are located beyond the extremities of the line of travel of the carriage 39, and the two lines of the belt 43 run medially, respectively, on the pulleys 46 and 47, loose on a vertical axle or rod 48, forming also the pivot or axle of the swinging frame 38. The lines of the belt 43 run, respectively, on the front of the pulley 46 and on the rear of the pulley 47, being held thereto by idle pulleys respectively at the front and at the rear (in the line of motion of the belt) of the pulleys 46 and 47 on stud-pins 49 49', fixed on the carriage-frame, Figs. 1, 2, and 3.

The pulleys 46 and 47 are located adjacent to each other and are each provided with a rim projecting toward each other, adapted to take thereon, concurrently or severally the bearing and travel of the flat belt 50, which also runs on a pulley 51, fixed on the shaft 37. A belt 52 runs on a speed-pulley 53, fixed on the shaft 37. One line of this belt 52 runs on and about the pulley 54, loose on the pintle 35, and the other line of the belt 52 runs on the pulley 55, journaled on the hub of pulley 54, and the belt is continued therefrom in a reverse direction to and about the idle pulley 56, mounted on a stud-pin secured adjustably to a member of the arm 34. A belt 57 runs on a pulley 55', integral with the pulley 55, and thence over two adjacent pulleys 58 58 and down alongside the post 31 to and about a pulley 59 on a shaft 60, journaled in the head-block 30. A belt 61 runs on a pulley 54', fixed on the hub or sleeve of the pulley 54, and thence over the adjacent pulleys 62 down to and about the pulley 59', fixed on the shaft 60', mounted in the head-block 30. By this construction the shafts 60 60' are rotated homogeneously from the speed-pulley 53, and by this method of belting an undesirable travel or creeping of the mechanism at the free extremity of the arm 34, that would occur if the ordinary lines of belt were used, is obviated. A collar 73 about the shaft 35, and secured thereto by a set-screw holds the pulleys 54 55 against endwise movement on the shaft. The pulleys 58 and 62 are mounted on arms 63 63, fixed in the top of the post 31.

The shafts 60 60' are provided with terminal disks 64 64' opposite the disks 19. The disks 64 64' are preferably provided with leather friction surfaces 65, that are adapted to engage the surfaces of the disks 19 and hold those disks in frictional clutch to the disks 64 64'. Segmental cams 66, fixed on a rock-shaft 67, journaled in lugs on the head 30, bear against the respective ends of the shafts 60 60' and by their oscillation are adapted to move those shafts endwise and carry the disks 64 64' into frictional clutch with the disks 19, thereby compelling the rotation of the wheel 18 with the shafts 60 60'. A radially-projecting handle 68, fixed on the rock-shaft 67, is a convenient means by which the operator can put the disks 64 64' into operative contact with the disks 19 and at the same time can move the cutter and the foot-plate in any direction. Antifriction-balls 72 are socketed in the ends of shafts 60 60'.

It will be noted that the cutter is driven constantly in the same direction from the pulleys 46 and 47, that rotate in the same direction, one line of the belt 43 running on one side of the pulley 46 and the other line of that belt running in the reverse direction on the opposite side of the pulley 47. To enable the operator to put either pulley 46 or 47 into stronger frictional contact with its respective line of the belt 43, and thereby to run the carriage 39 either forwardly or rearwardly on the rails 41, it is only necessary to shift the belt 50 onto one or the other of the pulleys 46 47. When the belt 50 bears about evenly on the rims of pulleys 46 and 47 in the manner indicated in Fig. 4, the carriage will remain stationary on the rails, because the belt 50 loads or holds the pulleys 46 and 47 about evenly against the friction thereon of the two lines of the belt 43; but for shifting the belt automatically onto one or the other of these pulleys 46 and 47 a shifting fork 69 is provided, which fork is one arm of a bell-crank pivoted medially on a stud-pin 70, fixed on the frame 38. The other arm 69' of the bell-crank extends loosely through a finger 71, fixed adjustably on the rod-axle 48. The construction is such that as the arm 34 is pulled forwardly with reference to the carriage 39 the belt 50 will be carried down onto the rim of the pulley 47, thus loading it to such extent as to cause the line of the belt 43 running thereon to contact therewith with considerable tenacity, compelling the travel of the carriage in conformity therewith along the line of the belt 43 toward the front, while at the same time the other line of the belt 43 will run loosely on the practically-free pulley 46. To reverse the travel of the carriage 39, the arm 34 and the frame 38 are pushed rearwardly by the operator, and thereupon the belt 50 is carried onto the pulley 46, thus loading it and securing the additional friction of that line of the belt 43 that runs thereon, whereby the carriage is caused to travel in the rearward direction.

What we claim as our invention is—

1. In a cloth-cutter, a foot-plate comprising a substantially-flat horizontally-disposed main plate, means supporting the main plate portably, and marginal plates hinged to the main plate at and about its edge forming a margin and continuous smooth surface normally inclining downwardly from said main plate.

2. In a cloth-cutter, a foot-plate comprising a flat main plate, means supporting the main plate above and so as to be readily movable on a table, downwardly-inclined plates forming an encircling margin to the main plate and so hinged to the main plate that their outer free edges normally adjust themselves freely to and travel on a supporting-table in the plane of the support of the foot-plate.

3. The combination in a foot-plate of a cloth-cutter, of a circular main plate having a top surface at a distance above its base or support, and segmental marginal plates hinged in a normally-inclined position to the main plate and so as to form a flexible sloping way from the plane of the base or foot of the plate up to the top surface of the main plate.

4. In a cloth-cutter, the combination with a plate, and an upright cutter-carrying standard thereon provided with a terminal head-block 20 at its upper end, of an opposite head-block 30, means connecting said last-enumerated head-block to a supporting device, and means for locking the standard head-block to the second-enumerated head-block detachably.

5. In a cloth-cutter, the combination with a foot-plate, a standard thereon provided with a head-block, an endless cutter mounted in the standard, and disks on the shaft of the cutter-driving wheel, of a post head-block secured detachably to the standard head-block, driven disks or clutches mounted in the post head-block, and means for putting the driven disks into engagement with the disks on the shaft of the cutter-driving wheel.

6. In a cloth-cutter, the combination with a cutter carrying and driving wheel provided with hubs having terminal disks, of opposite complementary driven disks mounted and movable endwise in their bearings, tilting cams adapted to be pressed against the ends of the axles of the driven disks and force them into clutch with the wheel-disks.

7. In a cloth-cutter, the combination of a horizontally-disposed swinging arm, cutting mechanism connected to and movable with the free extremity of the swinging arm, two loose pulleys mounted in the free extremity of the swinging arm, an idle pulley on the swinging arm medially, a belt running on and driven by a pulley at the hinged extremity of the swinging arm, and on and severally about said two pulleys at the free extremity of the swinging arm, and about the single idle pulley mounted on the swinging arm medially, and means connecting said two pulleys operatively to the cutting mechanism.

8. In a cloth-cutter, the combination with a carriage, a track on which the carriage is supported and is reciprocable, an endless belt stretched and running in the line of the travel of the carriage, two pulleys on the carriage on each of which a line of the belt runs driving said pulleys in opposite directions, a driven belt adapted to run on either or both of said pulleys, a swinging frame pivoted on the carriage in the line of the axis of said two pulleys carrying cutting mechanism, a bell-crank lever pivoted on a pin on the swinging frame, one arm of which lever straddles said driving-belt and the other arm of which is held against swinging movement by a finger on the carriage, whereby by the swinging of the frame the driven belt is shifted to one or the other or both of said reversely-running pulleys.

9. In a cloth-cutter, the combination with a swinging arm 34, a pintle 35 fixed thereto, a double pulley 54, 54' provided with an inter-pulley-hub loose on the pintle, and a second double pulley 55, 55' running on the hub of the other double pulley 54, 54', a single belt 52 one line of which runs on the first-named double pulley 54 and the other line of which runs on the other double pulley 55 rotating them in reverse directions, other belts running severally on the double pulleys 54' 55' mentioned and thence to shafts in a common axis, said shafts, and cutting mechanism connected operatively thereto.

10. In a cloth-cutter, the combination with a track and a carriage reciprocable thereon and provided with cutting mechanism, of a double line of belting stretched and running in opposite directions in the line of travel of the carriage, two loose pulleys mounted in the carriage on which said two lines of belting run respectively, idle wheels on the carriage in front and at the rear of said pulleys on which said lines of belting run adapted to hold the belting against the pulleys, and means for loading one or the other or both said pulleys to cause corresponding pull of the lines of belting on said pulleys for moving or stopping said carriage.

11. The combination with a horizontally-disposed swinging arm 34 provided with a vertical pintle 35 in its free extremity, of a foot-plate below and attached to said arm and adapted to travel on a table conformably with the movement of the free extremity of said swinging arm, cutting mechanism mounted on said foot-plate and swiveled on said pintle, and belting from a source of power carried on said swinging arm and connected to said cutting mechanism.

In testimony whereof we affix our signatures in presence of witnesses.

ARON G. SABERG.
ALBERT H. BENSON.
EDVIN G. SABERG.

Witnesses to Aron G. Saberg and Albert H. Benson:
C. T. BENEDICT,
ANNA V. FAUST.

Witnesses to Edvin G. Saberg:
BROR. CARSON,
H. HANCEL.